(12) United States Patent
Vishnubhotla et al.

(10) Patent No.: US 6,823,334 B2
(45) Date of Patent: Nov. 23, 2004

(54) METADATA SYSTEM FOR MANAGING DATA MINING ENVIRONMENTS

(75) Inventors: Prasad Rajendra Vishnubhotla, Round Rock, TX (US); Albert Zhongxing Yao, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 467 days.

(21) Appl. No.: 10/093,438

(22) Filed: Mar. 7, 2002

(65) Prior Publication Data

US 2003/0177117 A1 Sep. 18, 2003

(51) Int. Cl.$^7$ .............................................. G06F 17/30
(52) U.S. Cl. ..................... 707/5; 707/3; 707/2; 707/4; 707/6
(58) Field of Search ............................ 707/3, 5, 6, 2, 707/4; 706/12, 16

(56) References Cited

U.S. PATENT DOCUMENTS 6,240,411 B1 * 5/2001 Thearling ..................... 707/5

* cited by examiner

Primary Examiner—Shahid Alam
Assistant Examiner—Cam Y Truong
(74) Attorney, Agent, or Firm—John R. Biggers; Mark S. Walker; Biggers & Ohanian, LLP

(57) ABSTRACT

Managing a data mining environment, the data mining environment having a data mining tool and a data mining model. Embodiments include registering in a data set control table registered data sets, the registered data sets including the model training input data sets, model training results data sets, the scoring input data sets, and the scoring output data sets, registering the data mining model in a mining model control table, the mining model control table being related to the data set control table through a mining model control table foreign key, and registering the scoring output data sets in a scoring control table, the scoring control table being related to the data set control table through a scoring control table data set foreign key, the scoring control table being related to the mining model control table through a scoring control table mining model foreign key.

40 Claims, 8 Drawing Sheets

| 202 | 204 | 208 | 210 | 206 | 212 |
|---|---|---|---|---|---|
| data_id | data_name | data_type | usage_type | data_desc | data_location |
| 1,001 | wcamng. initchar | 0 | 0 | Summary input table for initiative related characteristics | wcamart |
| 1,002 | wcainitchar 12.xml | 2 | 2 | Training results data set for the data mining model in PMML format | d:\mining\data |
| 1,003 | wcamng. ititapp12 | 0 | 1 | Scoring output data set for scoring results | wcamart |
| 2,001 | wcamng. membsums | 0 | 0 | Summary input table for member related characteristics | wcamart |
| 2,002 | wcamng. membsumsamp | 0 | 0 | Sample data set used as input data set for training the data mining model | wcamart |
| 2,003 | wcamembchar2 2.xml | 2 | 2 | Training results data set for the data mining model in PMML format | d:\mining\data |
| 2,004 | wcamng. memapp22 | 0 | 1 | Scoring output data set for scoring results | wcamart |

(column 204 is labeled 106)

200

Data Set Control Table Structure

| | Column Name | Data Type | Note |
|---|---|---|---|
| 202 | data_id | Integer Not Null | Unique ID for a registered data set (Primary Key) |
| 204 | data_name | Varchar(32) Not Null | The name of this data set.<br>• The name of the table/view (for table/view)<br>• The name of the file (for files) |
| 206 | data_desc | Varchar(254) | Description of this data set |
| 208 | data_type | Integer | Type of the data set. 0-table, 1-view, or 2-file |
| 210 | usage_type | Integer | Usage of the data set. 0-input, 1-output, 2-input/output |
| 212 | data_location | Varchar(254) Not Null | • The database name (for table/view)<br>• The full file path (for files) |

Figure 2

Model Mining Control Table Structure 300

| | Column Name | Data Type | Note |
|---|---|---|---|
| 302 | model_id | Integer, Not Null | Unique ID for the data mining model (Primary Key) |
| 304 | model_name | Varchar(32) | The name of the data mining model. |
| 306 | model_desc | Varchar(254) | The description of the data mining model. |
| 308 | model_type | Integer | The type of the data mining model. |
| 310 | model_alg | Integer | The ID of the algorithm used for training the data mining model. |
| 312 | train_input_data_id | Integer, Not Null | The ID of the model training input data set used to train the data mining model. (Foreign key) |
| 314 | date_id | Integer | The date when the data mining model was last trained. |
| 316 | train_result_data_id | Integer, Not Null | The ID of the model training results data set for the data mining model as it is registered as a data source. (Foreign key) |
| 318 | train_result_file_name | Varchar(32) | The name of the model training results data set for the data mining model in PMML format. |
| 320 | file_location | Varchar(254) | The location where the model training results data set for the data mining model is saved. |

Scoring Control Table Structure

| | Column Name | Data Type | Note |
|---|---|---|---|
| 402 | scoring_output_data_id | Integer Not Null | The ID of the output data set that holds the scoring results. (Primary key) (Foreign key) |
| 404 | model_id | Integer, Not Null | The ID of the data mining model used for scoring. (Primary key) (Foreign key) |
| 406 | scoring_input_data_id | Integer | The ID of the input data set which is used as the input for the model scoring. (Primary key) (Foreign key) |
| 408 | scoring_output_data_name | Varchar(32), Not Null | Name of the output data set table which holds the scoring results. |
| 410 | scoring_setting_name | Varchar(32) | The name of the setting used for executing this scoring operation. |
| 412 | scoring_status | Char(1) | Status of whether the scoring output data set is actively used. 0 – inactive, 1 - active |

Figure 4

| data_id | data_name | data_type | usage_type | data_desc | data_location |
|---|---|---|---|---|---|
| 1,001 | wcamng.initchar | 0 | 0 | Summary input table for initiative related characteristics | wcamart |
| 1,002 | wcainitchar12.xml | 2 | 2 | Training results data set for the data mining model in PMML format | d:\mining\data |
| 1,003 | wcamng.ititapp12 | 0 | 1 | Scoring output data set for scoring results | wcamart |
| 2,001 | wcamng.membsums | 0 | 0 | Summary input table for member related characteristics | wcamart |
| 2,002 | wcamng.membsumsamp | 0 | 0 | Sample data set used as input data set for training the data mining model | wcamart |
| 2,003 | wcamembchar22.xml | 2 | 2 | Training results data set for the data mining model in PMML format | d:\mining\data |
| 2,004 | wcamng.memapp22 | 0 | 1 | Scoring output data set for scoring results | wcamart |

| model_id 302 | model_name 304 | model_type 308 | model_alg 310 | model_desc 306 | Train_input_data_id 312 | date_id 314 | train_result_id 316 | train_result_file_name 318 | file_location 320 |
|---|---|---|---|---|---|---|---|---|---|
| 1,101 | wcain-itchar12 | 1 | 0 | Relationship between shoppers and total order values | 1,001 | 0101 2002 | 1,002 | wcainitchar12.xml | d:\mining\data |
| 1,201 | wca-memb-char22 | 1 | 0 | Relationship between shoppers and total order values | 2,001 | 0101 2002 | 2,003 | wcamemb-char22.xml | d:\mining\data |

| scoring_output_data_id 402 | model_id 404 | scoring_input_data_id 406 | scoring_output_data_name 408 | scoring_setting_name 410 | scoring_status 412 |
|---|---|---|---|---|---|
| 1,003 | 1,101 | 1,001 | wcamng.initapp12 | wcainitchar12a | 1 |
| 2,004 | 1,201 | 2,001 | wcamng.memapp22 | wcamembchar22a | 1 |

↑ 118

METADATA SYSTEM FOR MANAGING DATA MINING ENVIRONMENTS

BACKGROUND OF THE INVENTION

1. Field of the Invention

The field of the invention is data processing, or, more specifically, methods, systems, and products for managing data mining environments.

2. Description of Related Art

Data mining tools, such as, for example, IBM's Intelligent Miner, are used directly in customer environments by connecting the tool to customer's historical and production databases. This often requires many changes in data mining activities because of the direct dependency on the names used in historical and production data. Data mining models have to be trained using historical data and then applied to multiple production data sets. Scoring results obtained by applying different mining models on different data sets are saved in different tables with different names. In environments having many data sets, many mining models and many mining models applied to many data sets, the relationships among the data sets, mining models and model scoring results become complicated. In current general art, there are only ad hoc ways of tracking these many data mining data sets, using, for example, user-defined tables or even word processing documents to attempt to track identities and relations among data mining data sets. There is generally no systematic way of organizing and managing all the data sets used in and created by many trainings and many applications of many data mining models in a data mining environment, although it would be advantageous if there were.

SUMMARY OF THE INVENTION

Exemplary embodiments of the invention typically comprise managing a data mining environment where the data mining environment includes a data mining tool and a data mining model. In typical embodiments, the data mining tool trains the data mining model using an input data set to create model training results and store the model training results in a model training results data set, and scores scoring input data sets using the model training results to produce scoring output and store the scoring output in scoring output data sets. Exemplary embodiments typically include registering in a data set control table registered data sets, the registered data sets including the model training input data sets, model training results data sets, the scoring input data sets, and the scoring output data sets. Some embodiments typically include registering the data mining model in a mining model control table, the mining model control table being related to the data set control table through a mining model control table foreign key. Other embodiments typically include registering the scoring output data sets in a scoring control table, the scoring control table being related to the data set control table through a scoring control table data set foreign key, the scoring control table being related to the mining model control table through a scoring control table mining model foreign key.

In exemplary embodiments, the data set control table typically includes an identification number for each registered data set, a name for each registered data set, and a description for each registered data set. In some embodiments, the data set control table typically includes a type for each registered data set, a usage for each registered data set, and a location for each registered data set.

In exemplary embodiments, the mining model control table typically includes an identification number for the data mining model, a model name for the data mining model, and a description for the data mining model. In some embodiments, the mining control table typically includes a model type for the data mining model, an algorithm used for training the data mining model, and an identification number for a model training input data set used by the data mining tool to train the data mining model. Other embodiments typically include a date the data mining model was last trained, an identification number for a model training results data set for the data mining model, a file name for the model training results data set for the data mining model, and a file location for the model training results data set for the data mining model.

In exemplary embodiments, the scoring control table typically includes an identification number for each scoring output data set, an identification number for a model training results data set for the scoring output data set, and an identification number for a scoring input data set for the scoring output data set. Some embodiments typically include a name for the scoring output data set, a name for a scoring setting, and a scoring status indicating whether the scoring output data set is actively used.

In exemplary embodiments, the mining model control table foreign key typically includes a model training input data set identification column in the mining model control table in which content from a registered data set identification column of the data set control table is stored, and the mining model control table relates to the data set control table through the foreign key. In some embodiments, the mining model control table foreign key typically includes a model training results data set identification column in the mining model control table in which content from a registered data set identification column of the data set control table is stored, and the mining model control table relates to the data set control table through the foreign key.

In exemplary embodiments of the invention, the scoring control table data set foreign key typically includes a scoring output data set identification column in the scoring control table in which content from a registered data set identification column of the data set control table is stored, and the scoring control table relates to the data set control table through the foreign key. In some embodiments, the scoring control table data set foreign key typically includes a scoring input data set identification column in the scoring control table in which content from a registered data set identification column of the data set control table is stored, and the scoring control table relates to the data set control table through the foreign key. In other embodiments, the scoring control table mining model foreign key typically includes a model identification column in the scoring control table in which content from a model identification column of the mining model control table is stored, and the scoring control table relates to the mining model control table through the foreign key.

In exemplary embodiments of the invention, the data set control table typically includes a registered data set identification column in which an identification number for each registered data set is stored. Such embodiments also include the step of indexing the data set control table data set identification column. In some embodiments, the mining model control table typically includes a model identification column in which an identification number for each data mining model is stored. Such embodiments also include indexing the mining model control table model identification column.

In exemplary embodiments of the invention, the scoring control table typically includes a scoring output data set identification column in which an identification number for each scoring output data set is stored, a scoring input data set identification column in which an identification number for each input data set used for scoring is stored, and a model identification column in which an identification number for each data mining model is stored. Such embodiments typically include indexing the scoring control table scoring output data set identification column, indexing the scoring control table scoring input data set identification column, and indexing the scoring control table model identification column. In some embodiments, the model training results data set is typically in Predictive Model Markup Language format.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 2 depicts an example of an embodiment of a metadata table structure for a data set control table.

FIG. 3 depicts an example of an embodiment of a metadata table structure for a mining model control table.

FIG. 4 shows an example of an embodiment of a metadata table structure a a scoring control table.

FIG. 8 is an example illustration of an embodiment of a data set control table.

FIG. 9 is an example illustration of an embodiment of a mining model control table.

FIG. 10 is an example illustration of an embodiment of a scoring control table.

DETAILED DESCRIPTION OF EXEMPLARY EMBODIMENTS

Introduction

Figure 1:
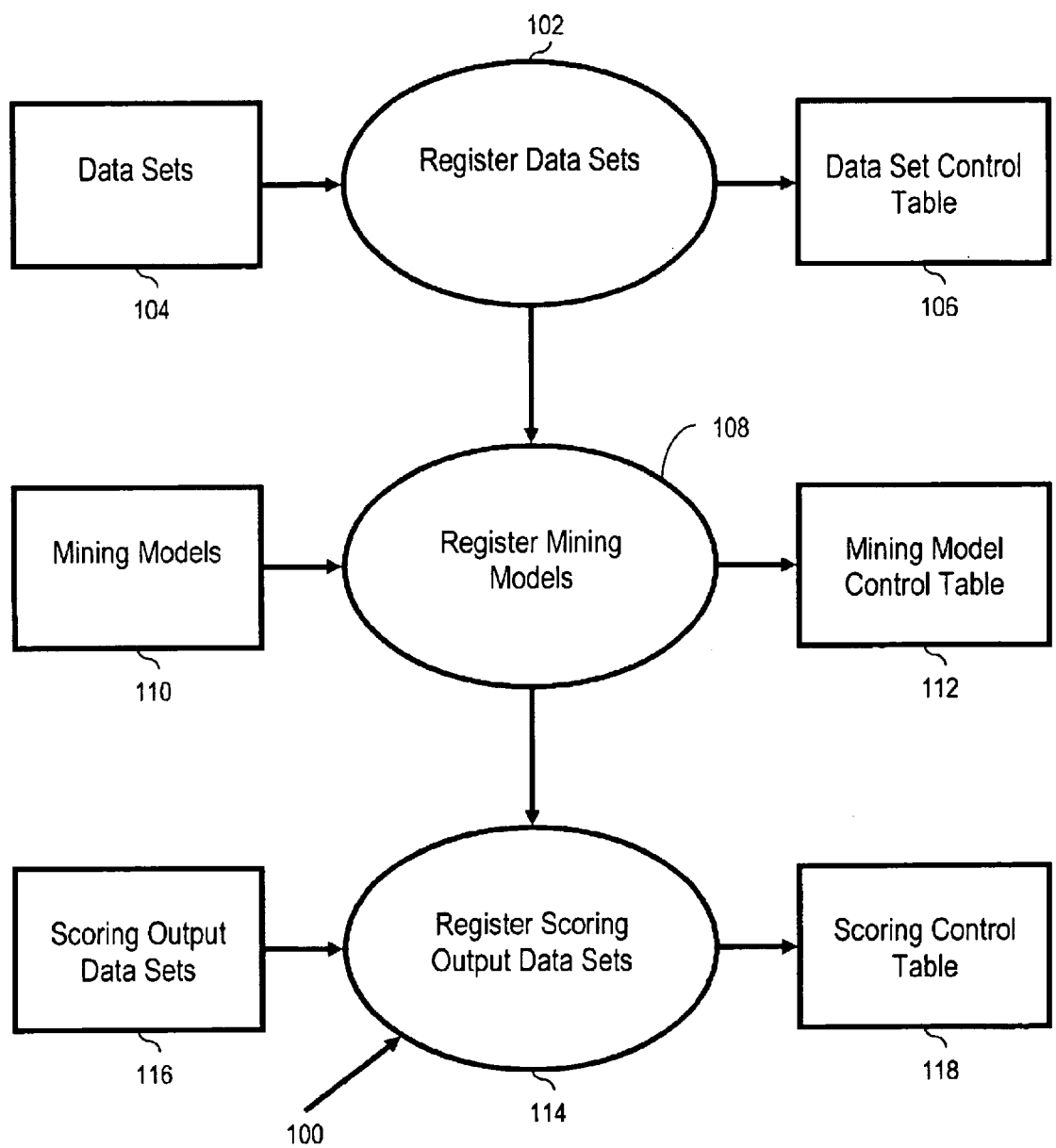
FIG. 1 is a general process flow diagram illustrating a typical example embodiment of the present invention.

The present invention is described to a large extent in this specification in terms of methods for managing data mining environments. Persons skilled in the art, however, will recognize that any computer system that includes suitable programming means for operating in accordance with the disclosed methods also falls well within the scope of the present invention.

Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system.

Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Definitions

In this specification, the terms "field" and "data element" are used as synonyms referring to individual elements of digital data. Aggregates of data elements are referred to as "records" or "data structures." Aggregates of records are referred to as "tables" or "files." Aggregates of tables are referred to as "databases."

A "view" is a virtual table arising during the use of database software as the software selects data from permanent tables in the database. The view has columns and rows giving the appearance of a table. The view is not permanent.

A "foreign key" is a column in a first table (the "referencing" or "child" table) that identifies a column in a second table (the "referenced" or "parent" table). When such a foreign key is present the two tables are said to be "related." Aggregates of related records and tables are called "relational databases." Records and fields in a table in a relational database are sometimes referred to respectively as "rows" and "columns."

The "Structured Query Language," or "SQL," is an industry-standard query language. The industry-standard SQL Data Definition Language ("DDL") is often used to create data schema or record structures for inclusion in data stores or files. In this specification, scripts operable as DDL scripts for creating record structures in tables are referred to as DDL scripts or as SQL scripts or as SQL DDL scripts.

Detailed Description

In this disclosure, we present exemplary embodiments of a "metadata system" that provides a systematic approach for managing relationships among data mining objects, or data mining data sets, in a data mining environment. Data mining objects, include, for example, input data sets, (e.g. historical data sets, production data sets, and saved data sampling data sets), data mining tools, and output data sets, (e.g. data mining model training results data sets and scoring results output data sets). Persons skilled in the art will recognize the foregoing data mining objects as those typically involved in a data mining environment wherein a data mining tool is used with the data mining objects in the performance of data mining activities. For convenience in describing typical embodiments of the present invention, we generally refer to IBM's Intelligent Miner as the data mining tool, although persons skilled in the art will realize that any general-purpose data mining tool providing standard data mining functionality is useful to carry out the pertinent steps for the exemplary embodiments of the present invention.

Embodiments of the present invention typically utilize a system of three related metadata tables to address the need to manage and describe the large number of data mining objects utilized and created when, during the use of a data mining tool, multiple scoring results are obtained by applying different data mining models on different data sets. The scoring results themselves are saved under different names in different output data sets.

Turning now to FIG. 1, an embodiment of the present invention is seen to provide a method for managing a data mining environment. The data mining environment has a data mining tool (100) and a data mining model (110). A typical data mining tool trains a data mining model using an input data set to create model training results and store the model training results in a model training results data set. Then, using the model training results, a data mining tool scores scoring input data sets to produce scoring output and store the scoring output in scoring output data sets.

Embodiments of the kind shown in FIG. 1 typically include registering (102) in a data set control table (106) registered data sets (104), the registered data sets including the model training input data sets, model training results data sets, the scoring input data sets, and the scoring output data sets. Such embodiments also typically include registering (108) the data mining model (110) in a mining model control table (112), the mining model control table being related to the data set control table through a mining model control table foreign key. Such embodiments typically also include registering (114) the scoring output data sets (116) in a scoring control table (118), the scoring control table being related to the data set control table through a scoring control table data set foreign key, the scoring control table also being related to the mining model control table through a scoring control table mining model foreign key.

Turning now to FIG. 2, a further embodiment of the present invention is illustrated by use of a data structure for a data set control table (200), in which the data structure comprises an identification number for each registered data set (202), a name for each registered data set (204), a description for each registered data set (206), a type for each registered data set (208), a usage for each registered data set (210), and a location for each registered data set (212). In some embodiments of the kind illustrated in FIG. 2, the data set name (204) has a value chosen as the name of a table if the data set is a database table, the name of a view if the data set is a database view, and the name of a file if the data set is a file. In some embodiments of the kind illustrated in FIG. 2, the data set type (208) has the value "0" if the data set type is a database table, the value "1" if the data set type is a database view, and the value "2" if the data set type is a file.

In some embodiments of the kind illustrated in FIG. 2, the data set usage (210) has the value "0" if the data set usage is for input, the value "1" if the data set usage is for output, and the value "2" if the data set usage is for both input and output. In some embodiments of the kind illustrated in FIG. 2, the data set location (212) has a value chosen as a database name if the data set is from a database, and as a full file path if the data set is in a file that is not within a database.

The following DDL script is an example of a script useful within various embodiments of the present invention to create a data set control table named "DATATABS" based upon the data set control table (106) described above and illustrated in FIG. 2.

```
create table DATATABS (
    data_id           integer not null,
    data_name         varchar(32) not null,
    data_desc         varchar(254),
    data_type         integer,
    usage_type        integer,
    data_location     varchar(254) not null,
    primary key (data_id)
);
```

It is a benefit of embodiments of the present invention that establishment and use of a data set control table (106) provides the identifications of data sets (104) stored in a readily accessed single location, along with other information specifically related to each of the data sets, such as the identification number (202), name (204), description (206) and location (212) of all data sets used by the data mining tool in scorings and model trainings. The data mining tool operator, by listing all applicable data sets and registering them in the data set control table, is thus provided with a metadata table with a complete description of such data sets, and has a management system for the same, even when the data sets are located in multiple locations, and when they are generated from multiple applications of different data mining models on different input data sets and from multiple trainings of different data mining models using different training input data. Furthermore, the data set control table is readily updatable to include new data sets. This updating activity is more readily managed and implemented using the data set control table.

Turning now to FIG. 3, a still further embodiment of the present invention is shown wherein a mining model control table is implement by data structure (300), the data structure comprising an identification number for the data mining model (302), a model name for the data mining model (304), a description for the data mining model (306), a model type for the data mining model (308), an algorithm used for training the data mining model (310), an identification number for a model training input data set used by the data mining tool to train the data mining model (312), a date the data mining model was last trained (314), an identification number for a model training results data set for the data mining model (316), a file name for the model training results data set for the data mining model (318), and a file location for the model training results data set for the data mining model (320). The following DDL script is an example of a script useful within exemplary embodiments of the present invention to create a mining model control table named "MODELTABS" based upon the mining model control table (reference 112 on FIG. 1) described above and using the data structure illustrated in FIG. 3.

```
create table MODELTABS (
    model_id              integer not null,
    model_name            varchar(32) not null,
    model_desc            varchar(254),
    model_type            integer,
    model_alg             integer,
    train_input_data_id   integer not null,
    date_id               integer,
    train_result_data_id  integer not null,
    train_result_file_name    varchar(32),
    file_location         varchar(254),
    primary key (model_id),
```

```
    constraint f_modeltab1 foreign key(train_input_data_id)
        references DATATABS(data_id) on delete restrict,
    constraint f_modeltab2 foreign key(train_result_data_id)
        references DATATABS(data_id) on delete restrict
);
```

Use of the mining model control table (112) provides the benefits of storing the identifications of all data mining models (110) in a readily accessed single location, along with other information specifically related to each of the data mining models, such as the identification number (302), name (304), description (306), type (308) and related algorithms (310) of all data mining models used by the data mining tool in scorings. The data mining tool operator, by listing all applicable data mining models and registering them in the mining model control table, is thus provided with a metadata table with a complete description of such data mining models, and has a management system for the same, even when the data mining models are located in multiple locations. Furthermore, the mining model control table is readily updatable to include new data mining models. The updating activity is more readily managed and implemented using the mining model control table.

Turning now to FIG. 4, a still further embodiment of the present invention is shown wherein the data structure of a typical scoring control table (112) is illustrated by data structure (400) as comprising an identification number for a scoring output data set containing (402), an identification number for a model training results data set for the scoring output data set (404), an identification number for a scoring input data set for the scoring output data set (406), a name for the scoring output data set (408), a name for a scoring setting (410), and a scoring status indicating whether the scoring output data set is actively used (412). In some embodiments of the kind illustrated in FIG. 4, the scoring status (410) has the value "0" if the scoring status is inactive and the value "1" if the scoring status is active. As indicated in FIG. 4, the scoring setting (410) is the name of the setting used for executing a scoring operation.

The following DDL script is an example of a script useful within exemplary embodiments of the present invention to create a scoring control table named "APPTABS" based upon the scoring control table (118) described above and illustrated in FIG. 4.

```
create table APPTABS (
    scoring_output_data_id      integer not null,
    model_id                    integer not null,
    scoring_input_data_id       integer not null,
    scoring_output_data_name    varchar(32),
    scoring_setting_name        varchar(32),
    scoring_status              integer,
    primary key (scoring_output_data_id, model_id,
        scoring_input_data_id),
    constraint f_apptab1 foreign key(scoring_output_data_id)
        references DATATABS(data_id) on delete restrict,
    constraint f_apptab2 foreign key(scoring_input_data_id)
        references DATATABS(data_id) on delete restrict,
    constraint f_apptab3 foreign key(model_id)
        references MODELTABS(model_id) on delete restrict
);
```

Use of the scoring control table (118) provides the benefits of storing all scoring results output data sets (402) are stored in a readily accessed single location, along with other information specifically related to each of the individual scoring results output data sets, such as the identification (404) of the data mining models utilized for the scoring, and the identification (406) of the input data used in the scoring. The data mining tool operator is thus provided with a metadata table with a complete description of such output data sets, and has a management system for the same, even when the output data sets are generated from multiple applications of different data mining models on different input data sets. Furthermore, the scoring control table is readily updatable to include new information such as new scoring settings. The updating activity is more readily managed and implemented using the scoring control table.

Returning to FIG. 3, a relationship of the data set control table (106) to the mining model control table (112) is shown wherein the mining model control table foreign key comprises the model training input data set identification (312) column in the mining model control table, in which is stored content from the registered data set identification (202) column of the data set control table (106). The referencing mining model control table relates to the referenced data set control table through the foreign key. The identification number for the model training input data set will be stored in the registered data set identification column of the data set control table and also in the model training input data set identification column of the mining model control table.

Returning again to FIG. 3, a relationship of the data set control table (106) to the mining model control table (112) is shown, wherein the mining model control table foreign key comprises the model training results data set identification (316) column in the mining model control table, in which is stored content from the registered data set identification (202) column of the data set control table (106). The referencing mining model control table relates to the referenced data set control table through the foreign key. The identification number for the model training results data set in such embodiments is stored in the registered data set identification column of the data set control table and also in the model training results data set identification column of the mining model control table.

Returning to FIG. 4, a relationship of the data set control table (106) to the scoring control table (118) is shown, wherein the scoring control table (118) data set foreign key comprises the scoring output data set identification (402) column in the scoring control table in which is stored content from the registered data set identification (202) column of the data set control table (106). The referencing scoring control table relates to the referenced data set control table through the foreign key. The identification number for the scoring output data set identification number in such embodiment typically is stored in the registered data set identification column of the data set control table and also in the scoring output data set identification column of the scoring control table.

Returning again to FIG. 4, a relationship of the data set control table (106) to the scoring control table (118) is shown, wherein the scoring control table (118) data set foreign key comprises the scoring input data set identification (402) column in the scoring control table in which is stored content from the registered data set identification (202) column of the data set control table (106). The referencing scoring control table relates to the referenced data set control table through the foreign key. The identification number for the scoring input data set identification number in typical embodiments of this kind is stored in the registered data set identification column of the data set control table and also in the scoring input data set identification column of the scoring control table.

Returning again to FIG. 4, a relationship of the mining model control table (112) to the scoring control table (118) is shown, wherein the scoring control table (118) mining model foreign key comprises the model identification (404) column in the scoring control table in which is stored content from the model identification (302) column of the mining model control table (112). The referencing scoring control table relates to the referenced mining control table through the foreign key. The identification number for the model is stored in the model identification column of the mining model control table and also in the mining model identification column of the scoring control table.

Figure 5:
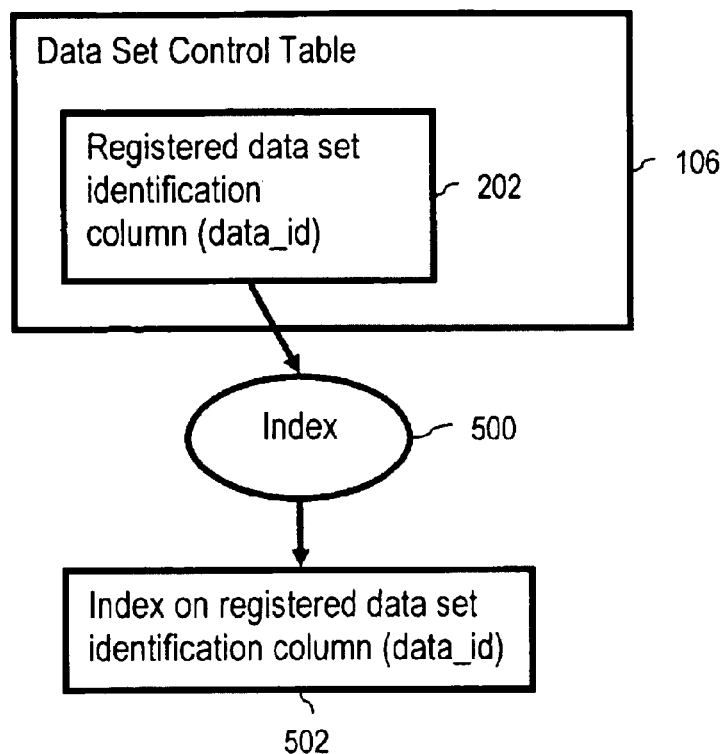
FIG. 5 is a process flow diagram illustrating an indexing aspect of a typical example embodiment of the present invention.

Turning now to FIG. 5, a more detailed embodiment of the data set control table (106) is shown wherein the data set control table comprises a registered data set identification column wherein an identification number (202) for each registered data set is stored. This embodiment further comprises indexing (500) the data set control table data set identification column create index (502).

Figure 6:
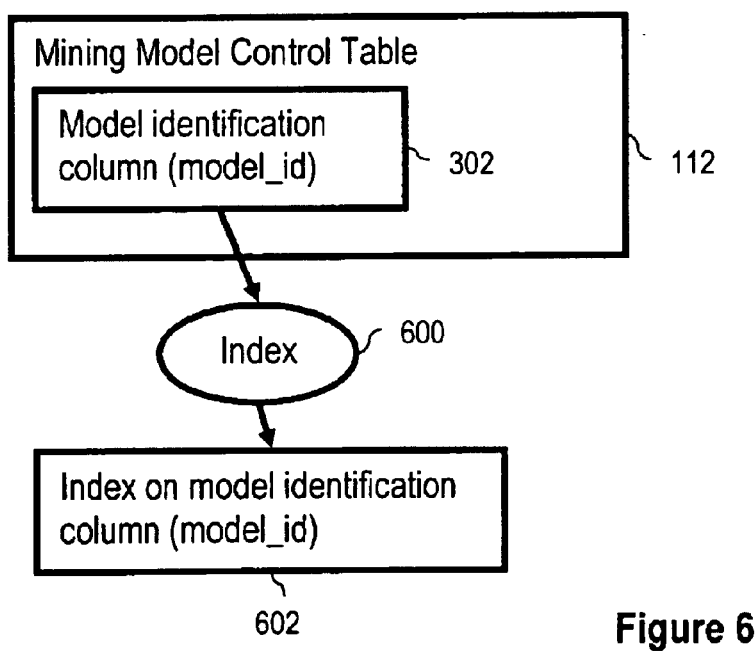
FIG. 6 is a process flow diagram illustrating an indexing aspect of a typical example embodiment of the present invention.

Turning now to FIG. 6, a more detailed embodiment of the mining model table (112) is shown wherein the mining model control table comprises a model identification column wherein an identification number (302) for each data mining model is stored. This embodiment further comprises indexing (600) the mining model control table model identification column to create index (602).

Figure 7:
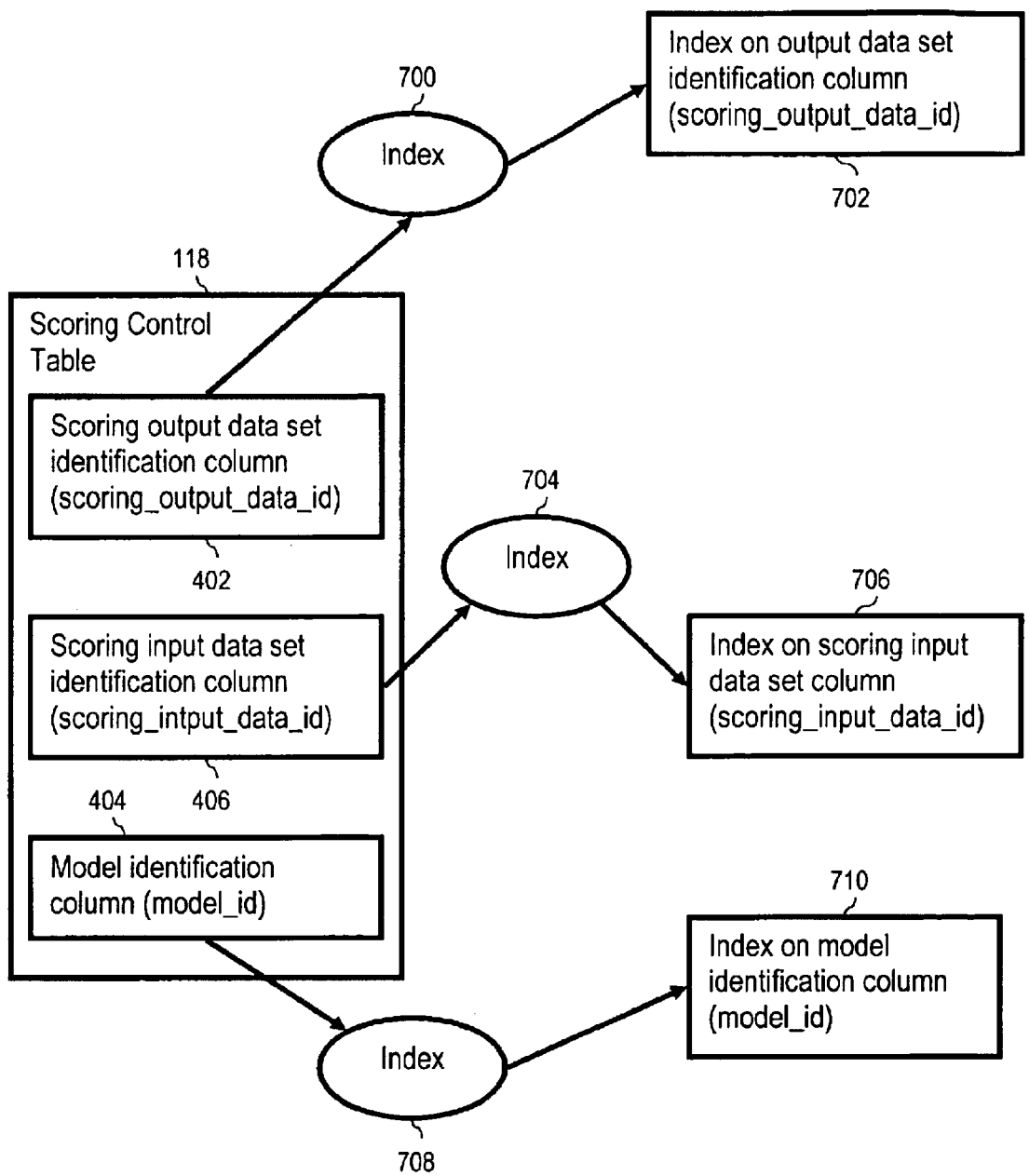
FIG. 7 is a process flow diagram illustrating an indexing aspect of a typical example embodiment of the present invention.

Turning now to FIG. 7, a more detailed embodiment of the scoring control table (118) is shown wherein the scoring control table comprises a scoring output data set identification (402) column wherein an identification number for each scoring output data set is stored, a scoring input data set identification (406) column wherein an identification number for each input data set used for scoring is stored, and a model identification (404) column wherein an identification number for each data mining model is stored. This embodiment further comprises indexing (700) the scoring control table scoring output data set identification (402) column to create index 702, indexing (704) the scoring control table scoring input data set identification (406) column to create index (706), and indexing (708) the scoring control table model identification (404) column to create index (710).

Returning to FIG. 3, in a more detailed embodiment of the mining model control table (112), the model training results data set (316) is in an XML (eXtensible Markup Language) format known as PMML (Predictive Modeling Markup Language. The model training results data set (316) also appears in the PMML format in the data set control table (106) as one of the registered data sets.

FIGS. 8-10 show the details of an exemplary embodiment of the present invention in an example of the meta data system wherein the data mining tool utilizes two different data mining models in two different scorings. The example uses the following "Demographic Segmentation Model A" (hereinafter "Model A") and "Demographic Segmentation Model B" (hereinafter "Model B").

Demographic Segmentation Model A:

| | |
|---|---|
| Data mining model name: | wcainitchar12 |
| Model training input data set for data mining model training: | wcamng.initchar |
| Training results data set for the data mining model (in PMML format): | wcainitchar12.xml |
| The scoring setting name for the | wcainitchar12a |

-continued

| | |
|---|---|
| scoring operation: | |
| Scoring input data set used as input for model scoring: | wcamng.initchar |
| Output data set for model scoring: | wcamng.initapp12 |
| Demographic Segmentation Model B: | |
| Data mining model name: | wcamembchar22 |
| Model training input data set for data mining model training: | wcamng.membsumsamp |
| Training results data set for the data mining model (in PMML format): | wcamembchar22.xml |
| The scoring setting name for the scoring operation: | wcamembchar22a |
| Scoring input data set used as input for model scoring: | wcamng.membsums |
| Output data set for model scoring: | wcamng.memapp22 |

With reference to Model A, and as illustrated in FIG. 9, the data mining model has the name (304) of "wcainitchar12" and the model identification number (302) of "1,101." The data mining model is defined by the data mining tool and trained with input data having the name of "wcamng.initchar" and an identification number (312) of "1,001." The trained data mining model is exported in PMML format in a file having the name (318) of "wcainitchar12.xml" with an identification number of "1,002." For Model A, the data mining model scores, i.e. is applied to, the same input data as was used in training the data mining model. This input data set is assigned the same identification number of "1,001," as shown in FIG. 9 and FIG. 10. The scoring results output data set is saved in a database table with the name (408) of "wcamng.initapp12" and with an identification number (402) of "1,003," as indicated in FIG. 10. The scoring setting executing the scoring operation has the name (410) of "wcainitcahr12a." In some embodiments the data mining model name (304) will be included in the scoring setting name.

With reference to Model B, and as illustrated in FIG. 9, the data mining model has the name (304) "wcamembchar22" and the model identification number (302) of "1,201." The data mining model is defined by the data mining tool and trained with an input data set that is a data sampling having the name of "wcamng.memsumbsamp" and an identification number (312) of "2,002." As shown in FIG. 9, the trained data mining model is exported in PMML format in a file having the name (318) of "wcamembchar22.xml" with an identification number of "2,003." As shown in FIG. 10, the data mining model scores the scoring input data set having an identification number (406) of "2,001" and the name of "wcamng.membsums." The scoring results output data set is saved in a database table with the name (408) of "wcamng.memapp22" and with an identification number (402) of "2,004." The scoring setting executing the scoring operation has the name (410) of "wcamembchar22a," the name including the data mining model name (304), which in this example is "wcamembchar22."

The foregoing example illustrates the thoroughness with which all information related to typical data mining operations is described in the three metadata tables, and the above-described foreign keys are shown in this example to have established referential integrity between selected columns in the tables. As shown in the example, the identification number "1,001" for an input data set has been first stored in the registered data set identification column of the metadata table referred to herein as the data set control table (reference 202 in FIG. 8). By virtue of one of the previously described mining model control table foreign keys, and one of the previously described scoring control table data set foreign keys, the identification number "1,001" is duplicated appropriately in the training input data identification column (reference 312 in FIG. 9) in the mining model control table (112), that is, the second metadata table. It is further duplicated in the scoring input data identification column (reference 406 in FIG. 10) of the scoring control table (118), that is, the third metadata table.

Similarly, by initially storing the identification number "1,003" in the registered data set identification column (reference 202 in FIG. 8) of the data set control table, embodiments of the metadata system of the present invention provide for a future scoring output data set to be described and identified by this number in a metadata table that describes all data sets of any type and simultaneously described, using the same identification number "1,003," in a metadata table that describes all scoring outputs and scoring output related information.

We have described the identification numbers "1,001" and "1,003" in specific detail as examples of the referential integrity between selected columns of the three metadata tables. Persons skilled in the art, upon review of this disclosure, generally, and the foregoing examples, particularly, will recognize and identify other examples of such referential integrity between selected metadata table columns, and will also recognize the advantages of using these exemplary embodiments of the present invention to manage data mining objects using metadata tables that completely describe and identify all such objects.

It will be understood from the foregoing description that various modifications and changes may be made in the exemplary embodiments of the present invention without departing from its true spirit. It is intended that this description is for purposes of illustration only and should not be construed in a limiting sense. The scope of this invention should be limited only by the language of the following claims.

What is claimed is:

1. A method for managing a data mining environment, the data mining environment having a data mining tool and a data mining model, wherein the data mining tool:

trains the data mining model using an input data set to create model training results and store the model training results in a model training results data set, and scores scoring input data sets using the model training results to produce scoring output and store the scoring output in scoring output data sets, the method comprising the steps of:

registering in a data set control table registered data sets, the registered data sets including the model training input data sets, model training results data sets, the scoring input data sets, and the scoring output data sets;

registering the data mining model in a mining model control table, the mining model control table being related to the data set control table through a mining model control table foreign key; and registering the scoring output data sets in a scoring control table, the scoring control table being related to the data set control table through a scoring control table data set foreign key, the scoring control table being related to the mining model control table through a scoring control table mining model foreign key.

2. The method of claim 1 wherein the data set control table comprises:

an identification number for each registered data set;

a name for each registered data set;

a description for each registered data set;

a type for each registered data set;

a usage for each registered data set; and a location for each registered data set.

3. The method of claim 1 wherein the mining model control table comprises:

an identification number for the data mining model;

a model name for the data mining model;

a description for the data mining model;

a model type for the data mining model;

an algorithm used for training the data mining model;

an identification number for a model training input data set used by the data mining tool to train the data mining model;

a date the data mining model was last trained;

an identification number for a model training results data set for the data mining model;

a file name for the model training results data set for the data mining model; and a file location for the model training results data set for the data mining model.

4. The method of claim 1 wherein the scoring control table comprises:

an identification number for each scoring output data set;

an identification number for a model training results data set for the scoring output data set;

an identification number for a scoring input data set for the scoring output data set;

a name for the scoring output data set;

a name for a scoring setting; and a scoring status indicating whether the scoring output data set is actively used.

5. The method of claim 1, wherein the mining model control table foreign key comprises a model training input data set identification column in the mining model control table in which is stored content from a registered data set identification column of the data set control table, the mining model control table relating to the data set control table through the foreign key.

6. The method of claim 1, wherein the mining model control table foreign key comprises a model training results data set identification column in the mining model control table in which is stored content from a registered data set identification column of the data set control table, the mining model control table relating to the data set control table through the foreign key.

7. The method of claim 1, wherein the scoring control table data set foreign key comprises a scoring output data set identification column in the scoring control table in which is stored content from a registered data set identification column of the data set control table, the scoring control table relating to the data set control table through the foreign key.

8. The method of claim 1, wherein the scoring control table data set foreign key comprises a scoring input data set identification column in the scoring control table in which is stored content from a registered data set identification column of the data set control table, the scoring control table relating to the data set control table through the foreign key.

9. The method of claim 1, wherein the scoring control table mining model foreign key comprises a model identification column in the scoring control table in which is stored content from a model identification column of the mining model control table, the scoring control table relating to the mining model control table through the foreign key.

10. The method of claim 1, wherein the data set control table comprises a registered data set identification column wherein an identification number for each registered data set is stored, the method further comprising the step of indexing the data set control table data set identification column.

11. The method of claim 1, wherein the mining model control table comprises a model identification column wherein an identification number for each data mining model is stored, the method further comprising indexing the mining model control table model identification column.

12. The method of claim 1, wherein the scoring control table comprises:
   a scoring output data set identification column wherein an identification number for each scoring output data set is stored,
   a scoring input data set identification column wherein an identification number for each input data set used for scoring is stored, and
   a model identification column wherein an identification number for each data mining model is stored,
   the method further comprising the steps of:
   indexing the scoring control table scoring output data set identification column,
   indexing the scoring control table scoring input data set identification column, and
   indexing the scoring control table model identification column.

13. The method of claim 1, wherein the model training results data set is in Predictive Model Markup Language format.

14. A method for managing a data mining environment, the data mining environment having a data mining tool and a data mining model, wherein the data mining tool:
   trains the data mining model using an input data set to create model training results and store the model training results in a model training results data set, and
   scores scoring input data sets using the model training results to produce scoring output and store the scoring output in scoring output data sets,
   the method comprising the steps of:
   registering in a data set control table registered data sets, the registered data sets including the model training input data sets, model training results data sets, the scoring input data sets, and the scoring output data sets, the data set control table further comprising:
   an identification number for each registered data set;
   a name for each registered data set;
   a description for each registered data set;
   a type for each registered data set;
   a usage for each registered data set; and
   a location for each registered data set;
   registering the data mining model in a mining model control table, the mining model control table further comprising:
   an identification number for the data mining model;
   a model name for the data mining model;
   a description for the data mining model;
   a model type for the data mining model;
   an algorithm used for training the data mining model;
   an identification number for a model training input data set used by the data mining tool to train the data mining model;
   a date the data mining model was last trained;
   an identification number for a model training results data set for the data mining model;
   a file name for the model training results data set for the data mining model; and
   a file location for the model training results data set for the data mining model; and
   registering the scoring output data sets in a scoring control table, the scoring control table further comprising:
   an identification number for each scoring output data set;
   an identification number for a model training results data set for the scoring output data set;
   an identification number for a scoring input data set for the scoring output data set;
   a name for the scoring output data set;
   a name for a scoring setting; and
   a scoring status indicating whether the scoring output data set is actively used;
   wherein:
   a mining model control table first foreign key comprises a model training input data set identification column in the mining model control table in which is stored content from a registered data set identification column of the data set control table, the mining model control table relating to the data set control table through the mining model control table first foreign key;
   a mining model control table second foreign key comprises a model training results data set identification column in the mining model control table in which is stored content from a registered data set identification column of the data set control table, the mining model control table relating to the data set control table through the mining model control table second foreign key;
   a scoring control table first foreign key comprises a scoring output data set identification column in the scoring control table in which is stored content from a registered data set identification column of the data set control table, the scoring control table relating to the data set control table through the scoring output table first foreign key;
   a scoring control table second foreign key comprises a scoring input data set identification column in the scoring control table in which is stored content from a registered data set identification column of the data set control table, the scoring control table relating to the data set control table through the scoring control table second foreign key; and
   a scoring control table third foreign key comprises a model identification column in the scoring control table in which is stored content from a model identification column of the mining model control table, the scoring control table relating to the mining model control table through the scoring output table third foreign key.

15. A system for managing a data mining environment, the data mining environment having a data mining tool and a data mining model, wherein the data mining tool:
   trains the data mining model using an input data set to create model training results and store the model training results in a model training results data set, and
   scores scoring input data sets using the model training results to produce scoring output and store the scoring output in scoring output data sets, the system comprising:

means for registering in a data set control table registered data sets, the registered data sets including the model training input data sets, model training results data sets, the scoring input data sets, and the scoring output data sets;

means for registering the data mining model in a mining model control table, the mining model control table being related to the data set control table through a mining model control table foreign key; and means for registering the scoring output data sets in a scoring control table, the scoring control table being related to the data set control table through a scoring control table data set foreign key, the scoring control table being related to the mining model control table through a scoring control table mining model foreign key.

16. The system of claim 15 wherein the data set control table comprises:

an identification number for each registered data set;

a name for each registered data set;

a description for each registered data set;

a type for each registered data set;

a usage for each registered data set; and a location for each registered data set.

17. The system of claim 15 wherein the mining model control table comprises:

an identification number for the data mining model;

a model name for the data mining model;

a description for the data mining model;

a model type for the data mining model;

an algorithm used for training the data mining model;

an identification number for a model training input data set used by the data mining tool to train the data mining model;

a date the data mining model was last trained;

an identification number for a model training results data set for the data mining model;

a file name for the model training results data set for the data mining model; and a file location for the model training results data set for the data mining model.

18. The system of claim 15 wherein the scoring control table comprises:

an identification number for each scoring output data set;

an identification number for a model training results data set for the scoring output data set;

an identification number for a scoring input data set for the scoring output data set;

a name for the scoring output data set;

a name for a scoring setting; and a scoring status indicating whether the scoring output data set is actively used.

19. The system of claim 15, wherein the mining model control table foreign key comprises a model training input data set identification column in the mining model control table in which is stored content from a registered data set identification column of the data set control table, the mining model control table relating to the data set control table through the foreign key.

20. The system of claim 15, wherein the mining model control table foreign key comprises a model training results data set identification column in the mining model control table in which is stored content from a registered data set identification column of the data set control table, the mining model control table relating to the data set control table through the foreign key.

21. The system of claim 15, wherein the scoring control table data set foreign key comprises a scoring output data set identification column in the scoring control table in which is stored content from a registered data set identification column of the data set control table, the scoring control table relating to the data set control table through the foreign key.

22. The system of claim 15, wherein the scoring control table data set foreign key comprises a scoring input data set identification column in the scoring control table in which is stored content from a registered data set identification column of the data set control table, the scoring control table relating to the data set control table through the foreign key.

23. The system of claim 15, wherein the scoring control table mining model foreign key comprises a model identification column in the scoring control table in which is stored content from a model identification column of the mining model control table, the scoring control table relating to the mining model control table through the foreign key.

24. The system of claim 15, wherein the data set control table comprises a registered data set identification column wherein an identification number for each registered data set is stored, the system further comprising means for indexing the data set control table data set identification column.

25. The system of claim 15, wherein the mining model control table comprises a model identification column wherein an identification number for each data mining model is stored, the system further comprising means for indexing the mining model control table model identification column.

26. The system of claim 15, wherein the scoring control table comprises:

a scoring output data set identification column wherein an identification number for each scoring output data set is stored, a scoring input data set identification column wherein an identification number for each input data set used for scoring is stored, and a model identification column wherein an identification number for each data mining model is stored, the system further comprising:

means for indexing the scoring control table scoring output data set identification column, means for indexing the scoring control table scoring input data set identification column, and means for indexing the scoring control table model identification column.

27. The system of claim 15, wherein the model training results data set is in Predictive Model Markup Language format.

28. A computer program product for managing a data mining environment, the data mining environment having a data mining tool and a data mining model, wherein the data mining tool:

trains the data mining model using an input data set to create model training results and store the model training results in a model training results data set, and scores scoring input data sets using the model training results to produce scoring output and store the scoring output in scoring output data sets, the computer program product comprising:

a recording medium;

means, recorded on the recording medium, for registering in a data set control table registered data sets, the registered data sets including the model training input data sets, model training results data sets, the scoring input data sets, and the scoring output data sets;

means, recorded on the recording medium, for registering the data mining model in a mining model control table, the mining model control table being related to the data set control table through a mining model control table foreign key; and means, recorded on the recording medium, for registering the scoring output data sets in a scoring control table, the scoring control table being related to the data set control table through a scoring control table data set foreign key, the scoring control table being related to the mining model control table through a scoring control table mining model foreign key.

29. The computer program product of claim 28 wherein the data set control table comprises:

an identification number for each registered data set;

a name for each registered data set;

a description for each registered data set;

a type for each registered data set;

a usage for each registered data set; and a location for each registered data set.

30. The computer program product of claim 28 wherein the mining model control table comprises:

an identification number for the data mining model;

a model name for the data mining model;

a description for the data mining model;

a model type for the data mining model;

an algorithm used for training the data mining model;

an identification number for a model training input data set used by the data mining tool to train the data mining model;

a date the data mining model was last trained;

an identification number for a model training results data set for the data mining model;

a file name for the model training results data set for the data mining model; and a file location for the model training results data set for the data mining model.

31. The computer program product of claim 28 wherein the scoring control table comprises:

an identification number for each scoring output data set;

an identification number for a model training results data set for the scoring output data set;

an identification number for a scoring input data set for the scoring output data set;

a name for the scoring output data set;

a name for a scoring setting; and a scoring status indicating whether the scoring output data set is actively used.

32. The computer program product of claim 28, wherein the mining model control table foreign key comprises a model training input data set identification column in the mining model control table in which is stored content from a registered data set identification column of the data set control table, the mining model control table relating to the data set control table through the foreign key.

33. The computer program product of claim 28, wherein the mining model control table foreign key comprises a model training results data set identification column in the mining model control table in which is stored content from a registered data set identification column of the data set control table, the mining model control table relating to the data set control table through the foreign key.

34. The computer program product of claim 28, wherein the scoring control table data set foreign key comprises a scoring output data set identification column in the scoring control table in which is stored content from a registered data set identification column of the data set control table, the scoring control table relating to the data set control table through the foreign key.

35. The computer program product of claim 28, wherein the scoring control table data set foreign key comprises a scoring input data set identification column in the scoring control table in which is stored content from a registered data set identification column of the data set control table, the scoring control table relating to the data set control table through the foreign key.

36. The computer program product of claim 28, wherein the scoring control table mining model foreign key comprises a model identification column in the scoring control table in which is stored content from a model identification column of the mining model control table, the scoring control table relating to the mining model control table through the foreign key.

37. The computer program product of claim 28, wherein the data set control table comprises a registered data set identification column wherein an identification number for each registered data set is stored, the computer program product further comprising means, recorded on the recording medium, for indexing the data set control table data set identification column.

38. The computer program product of claim 28, wherein the mining model control table comprises a model identification column wherein an identification number for each data mining model is stored, the computer program product further comprising means, recorded on the recording medium, for indexing the mining model control table model identification column.

39. The computer program product of claim 28, wherein the scoring control table comprises:

a scoring output data set identification column wherein an identification number for each scoring output data set is stored, a scoring input data set identification column wherein an identification number for each input data set used for scoring is stored, and a model identification column wherein an identification number for each data mining model is stored, the computer program product further comprising:

means, recorded on the recording medium, for indexing the scoring control table scoring output data set identification column, means, recorded on the recording medium, for indexing the scoring control table scoring input data set identification column, and means, recorded on the recording medium, for indexing the scoring control table model identification column.

40. The computer program product of claim 28, wherein the model training results data set is in Predictive Model Markup Language format.

* * * * *